W. W. COULTER.
TRACTION WHEEL.
APPLICATION FILED APR. 28, 1915.
1,155,704.
Patented Oct. 5, 1915.
2 SHEETS—SHEET 1.
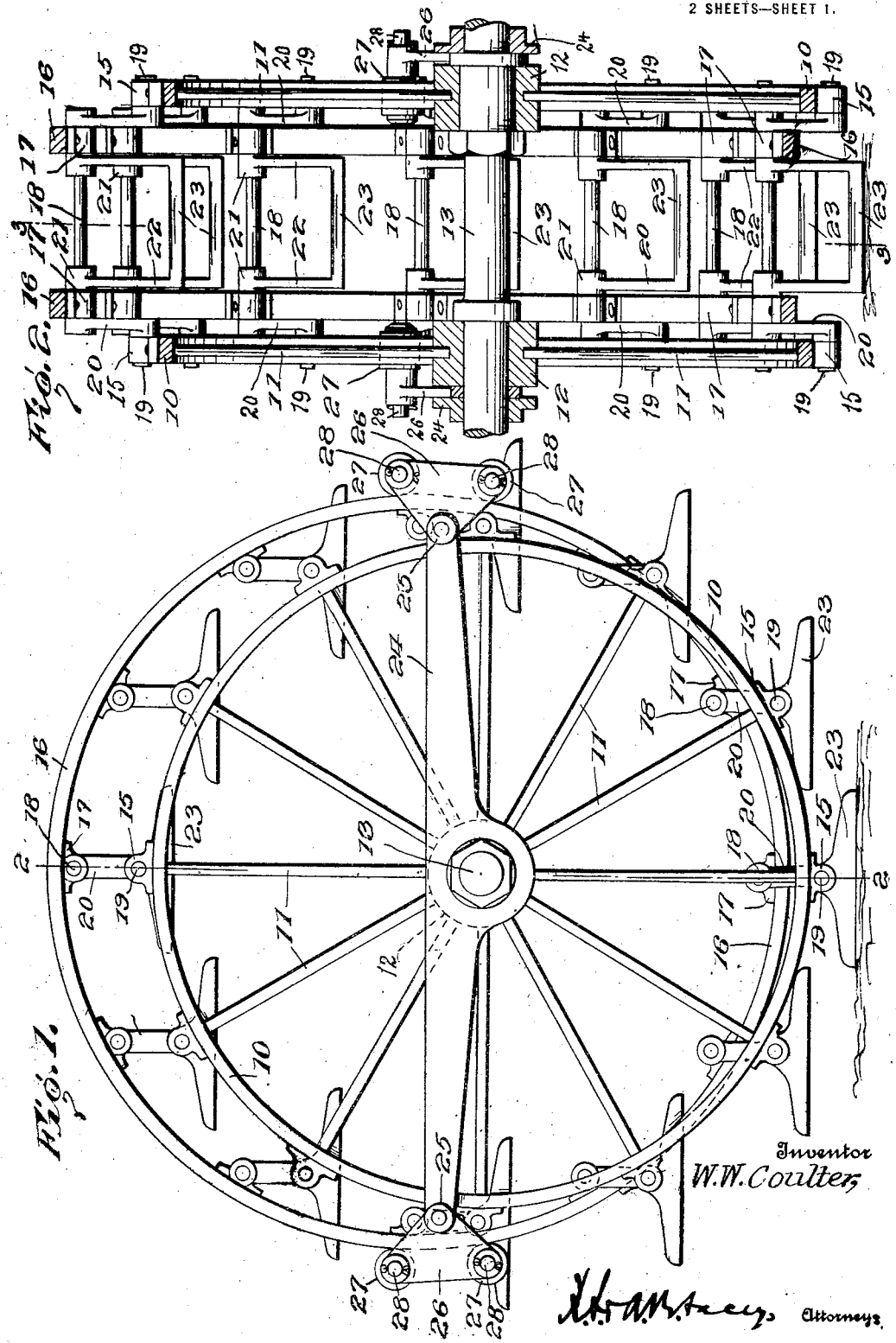
Inventor
W. W. Coulter
Attorneys

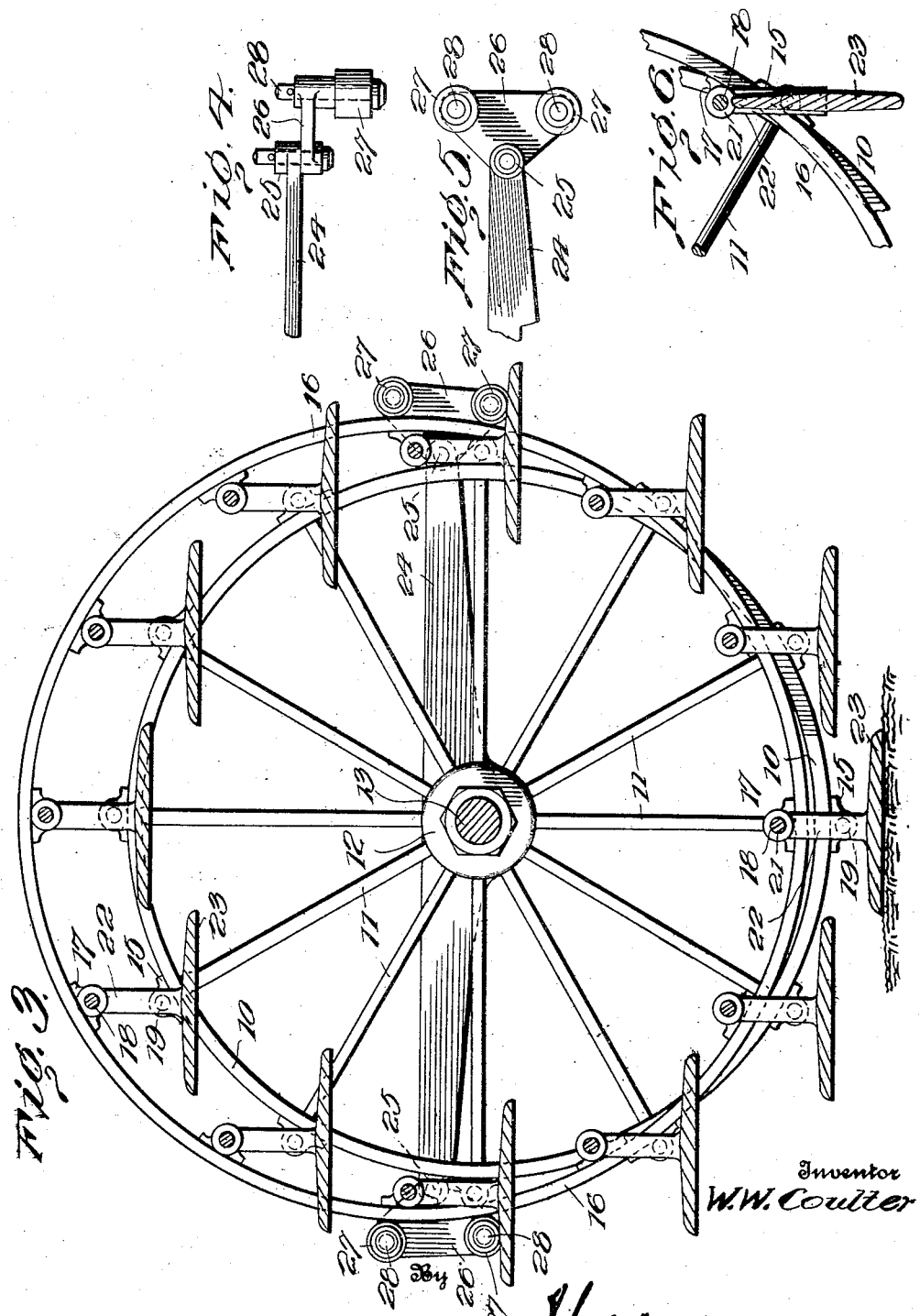

UNITED STATES PATENT OFFICE.

WILLIAM W. COULTER, OF GARRISON, NORTH DAKOTA.

TRACTION-WHEEL.

1,155,704.  Specification of Letters Patent.  Patented Oct. 5, 1915.

Application filed April 28, 1915. Serial No. 24,549.

*To all whom it may concern:*

Be it known that I, WILLIAM W. COULTER, a citizen of the United States, residing at Garrison, in the county of McLean and State of North Dakota, have invented certain new and useful Improvements in Traction-Wheels, of which the following is a specification.

This invention relates to improvements in wheels and adapted for use more particularly upon traction engines, but which may be adapted without material structural change to the paddle wheels of marine craft, and has as one of its objects to improve the construction and increase the efficiency and utility of devices of this character.

Another object of the invention is to provide a simply constructed device whereby the tractive force of the wheel or the propelling force of a paddle wheel are materially increased.

With these and other objects in view the invention consists in certain novel features of construction as hereinafter shown and described and then specifically pointed out in the claims.

The improved device may be applied without material structural change to the traction wheels of engines or similar vehicles, or the paddle wheels of marine craft, but for the purpose of illustration the improved device is shown applied to one of the wheels of a traction engine, and in the drawings illustrative of the preferred embodiment of the invention Figure 1 is a side elevation of one of the improved wheels arranged for use upon a traction engine. Fig. 2 is a section on the line 2—2 of Fig. 1. Fig. 3 is a section on the line 3—3 of Fig. 2. Figs. 4 and 5 are enlarged details of one of the holding devices of the eccentrically supported member. Fig. 6 is a detail view illustrating the manner of arranging the improved device to operate as a feathering paddle wheel.

Corresponding and like parts are referred to in the following description and indicated in all the views of the drawings by the same reference characters.

The improved device includes annular members 10 spaced apart and connected by spokes 11 to hubs 12 mounted for rotation upon a shaft 13.

Mounted upon the outer face of each of the rims 10 at spaced intervals are bearings 15. Any required number of the bearings may be employed, but for the purpose of illustration twelve are shown. Located between the rims 10 and spaced apart are other rims 16 having bearings 17, corresponding in number to the bearings 15 of the rim 10. Extending through each opposite pair of the bearings 17 is a shaft 18, the shafts projecting beyond the bearings 17 at their terminals. Each of the bearings 15 is provided with a stud 19, and connecting each contiguous pair of the studs 19 and the projecting terminals of the shaft 18 are links 20.

Rigidly connected to each of the shafts 18 by bearings 21 is a U-shaped member comprising side members 22 and a flat laterally extended bearing member 23. The links 20 are rigidly coupled to the shafts 18 while the bearings 21, as before stated, are also rigidly coupled to the shaft 18.

Mounted to swing upon the shaft 13 externally of each of the hubs 12 is a bar or frame member 24 having bearings 25 at the ends. Mounted to swing upon each of the bearings 25 is a triangular frame 26 having bearing rollers 27 pivotally connected thereto at 28 and bearing respectively against the outer faces of the rim members 16. The rim members 16 are thus maintained constantly eccentric to the rim member 10, as illustrated in Figs. 1 and 2. By this arrangement, it will be obvious that when the outer wheels, including the rims 10, spokes 11 and hubs 12 are rotated upon the shaft 13, the bearing members 23 will be caused to maintain a horizontal position or in parallel relation to the ground over which the wheel is traveling and that the members 23 which, for the time being, are presented downwardly, will engage flatwise upon the ground and thus materially increase the tractive force of the wheel, while the members 16 with their attachments will be retained in position eccentric to the wheels by the supporting devices which include the bearing rollers 27 and the bar 24. As the wheel rotates the members 23 will be consecutively engaged with the ground and thus materially increase the tractive force of the wheel.

To adapt the improved device for use as a feathering paddle wheel it is only necessary to arrange the members 23 as shown in Fig. 6.

The improved device is simple in construction, can be economically and strongly constructed of any suitable material and of any suitable size, and adapted without material structural change to traction engines and like devices or to the paddle wheels of vessels, as may be required.

Having thus described the invention, what is claimed as new is:—

1. An apparatus of the class described comprising a main wheel device mounted for rotation and having a plurality of bearings spaced apart, a supplemental wheel device having a plurality of bearings spaced apart, links mounted for rotation respectively relative to the bearings of said main wheel device and to the bearings of the supplemental wheel device, bearing members including flat portions maintained normally in horizontal position and connected rigidly relative to said links, and means for maintaining said supplemental wheel device in position eccentric to the main wheel device.

2. An apparatus of the class described comprising a main wheel device mounted for rotation and having a plurality of bearings spaced apart, a supplemental wheel device including annular members spaced apart and each having a plurality of bearings spaced apart, a plurality of shafts connecting the bearings of said annular members, links mounted for rotation respectively relative to the bearings of said main wheel device and rigidly connected to the shafts of the supplemental wheel device, bearing members including flat portions maintained normally in horizontal position and connected rigidly to said shafts, and means for maintaining said supplemental wheel device in position eccentric to the main wheel device.

3. An apparatus of the class described comprising a main wheel device mounted for rotation, a supplemental wheel device, a plurality of links mounted for rotation respectively relative to said main wheel device and to the supplemental wheel device, bearing members including flat portions maintained normally in horizontal position and connected rigidly to said links, and means for maintaining said supplemental wheel device in position eccentric to the main wheel device.

4. An apparatus of the class described comprising a main wheel device mounted for rotation and having a plurality of bearings spaced apart, a supplemental wheel device having a plurality of bearings spaced apart, links mounted for rotation respectively relative to the bearings of said main wheel device and to the bearings of the supplemental wheel device, bearing members including flat portions maintained normally in horizontal position and connected rigidly relative to said links, frame members, and bearing rollers supported relative to said frame members and engaging said supplemental wheel device and maintaining the same eccentric relative to said main wheel device.

5. An apparatus of the class described comprising a main wheel device mounted for rotation and having a plurality of bearings spaced apart, a supplemental wheel device having a plurality of bearings spaced apart, links mounted for rotation respectively relative to the bearings of said main wheel device and to the bearings of the supplemental wheel device, bearing members connected rigidly relative to said links, frame members, holding members mounted to swing upon said frame members, and bearing rollers carried by said swinging holding members and engaging said supplemental wheel device and maintaining the same eccentric relative to the main wheel device.

6. An apparatus of the class described comprising a shaft, a main wheel rotative with said shaft, a plurality of bearings spaced apart and carried by said wheel, an annular member, a plurality of bearings carried by said annular member, links connecting the bearings of said wheel and the bearings of said annular member, bearing members including flat portions maintained normally in horizontal position and connected rigidly relative to said links, frame members carried by said shaft, and bearing rollers carried by said frame member and engaging said annular member.

7. An apparatus of the class described comprising a shaft, wheels spaced apart and rotative with said shaft, bearings spaced apart and carried by said wheels, annular members, bearings carried by said annular members, shafts mounted for rotation in the bearings of said annular members, links mounted for rotation relative to the bearings of said wheels and rigidly coupled to the shafts of said annular members, bearing members including flat portions maintained normally in horizontal position and connected rigidly to the shafts of said annular members, frame members carried by said shaft, and bearing rollers carried by said frame member and engaging said annular members.

In testimony whereof I affix my signature in presence of two witnesses.

WILLIAM W. COULTER. [L. S.]

Witnesses:
JENKIN WILLIAMS,
E. H. ROBY.